United States Patent [19]
Erdmann et al.

[11] 3,852,374
[45] Dec. 3, 1974

[54] TANNING AGENTS

[75] Inventors: Hans Erdmann, Heidelberg; Franz-Friedirch Miller, Ludwigshafen; Alfred Zissel, Frankenthal, all of Germany

[73] Assignee: Badische Anilin- & Soda-Fabrik Aktiengesellschaft, Ludwigshafen/Rhein, Germany

[22] Filed: Nov. 24, 1972

[21] Appl. No.: 309,471

[30] Foreign Application Priority Data
Nov. 26, 1971 Germany............................ 2158610

[52] U.S. Cl............... 260/839, 8/94.24, 260/29.3, 260/51.5, 260/840
[51] Int. Cl........................ C14c 3/20, C08g 37/16
[58] Field of Search.......... 260/839, 840, 29.3, 51.5

[56] References Cited
UNITED STATES PATENTS

| | | | |
|---|---|---|---|
| 1,841,840 | 1/1932 | Muller | 260/840 |
| 2,242,681 | 5/1941 | Schafer et al. | 260/840 |
| 3,475,113 | 10/1969 | Sellet | 260/840 |
| 3,637,561 | 1/1972 | Schnur et al. | 260/840 |
| 3,640,932 | 2/1972 | Schnur | 260/840 |

FOREIGN PATENTS OR APPLICATIONS

| | | | |
|---|---|---|---|
| 936,560 | 9/1963 | Great Britain | 260/840 |

Primary Examiner—John C. Bleutge
Attorney, Agent, or Firm—Johnston, Keil, Thompson & Shurtleff

[57] ABSTRACT

The production of tanning agents based on condensation products of formaldehyde, phenolsulfonic acids, nitrogenous compounds and bisulfite.

5 Claims, No Drawings

TANNING AGENTS

The invention relates to the production of new tanning agents based on condensation products of a phenolsulfonic acid, formaldehyde, a nitrogenous compound and bisulfite.

It is known that nitrogenous bases such as urea may be contained in condensed form in syntans based on phenolsulfonic acids and formaldehyde up to a maximum proportion of 1.5 moles per mole of phenol. There is a detailed disclosure of this for example in German Pat. No. 1,113,457.

Condensation products obtainable according to the said disclosure are distinguished by excellent pigmenting action and the fairly high light fastness, high fullness and white color obtained on leather. There has however been a desire to improve these properties particularly as regards light fastness, which by present day standards is not always satisfactory. The reason for this is probably to be found in the large number of oxidizable phenol compounds.

It is an object of the invention to provide a method which gives the desired results using a smaller proportion of phenolic constituents. Phenols are known to be very expensive and the level of aromatic substances has to be kept as low as possible having regard to their toxic effects.

It is a particular object to provide a new type of condensation product in which the proportion of phenol is lower without any decrease in the tanning effect.

We have found that units of nitrogenous bases (which include urea, melamine, dicyandiamide and formaldehyde precondensates of the same which are still soluble in water) may be condensed into phenolic syntans (i.e., condensates of phenolsulfonic acid, formaldehyde and urea) in amounts which are at least 50 percent higher than those hitherto attainable.

The process for the production of tanning agents based on condensation products by reaction of a sulfonated phenol devoid of condensed ring systems with formaldehyde, urea, melamine and/or dicyandiamide and bisulfite consists in allowing a. a condensation product of phenolsulfonic acid, urea and formaldehyde in a molar ratio of 1:1 to 1.5:1.2 to 2.2 which has been adjusted to a pH of from 10 to 13 and b. a methylol compound of urea, melamine and/or dicyandiamide of a degree of sulfitation corresponding to a molar ratio of bisulfite to nitrogen compound of from 1:0.20 to 1:1.20, preferably from 1:0.66 to 1:1.0, to act on each other in a molar ratio of (a):(b) of 1:1 to 1:9 and then adjusting the reaction product to a pH of from 3.5 to 5.0

As the relative proportions given clearly show, these compounds have a nitrogen excess of more than 50 percent as compared with prior art condensation products and accordingly an about 50 percent lower proportion of aromatic units.

More specifically, the process of the invention consists in reacting under special condensation conditions the phenolic syntans (a) (which for example already contain 1 mole of urea to 1 mole of phenolsulfonic acid attached to formaldehyde but, contrary to the teaching of German Pat. No. 1,113,457, have not undergone any aftercondensation with unsulfonated phenol and formaldehyde) not as usual in a strongly acid medium but in the strongly alkaline region from pH 10 to 13, preferably from 10.5 to 11.5 with the methylol compounds of the said nitrogen bases or their partially sulfitated or precondensed secondary products. These condensation products are then adjusted to pH 3.5 to 5.0 with an acid.

Phenolsulfonic acids which have then been reacted with formaldehyde and urea according to the disclosure of German Pat. No. 1,113,457 into syntans are the starting products for the process of the invention. The procedure generally is that from 1 to 1.5 moles of urea and from 1.2 to 2.2 moles of formaldehyde are used per mole of sulfonated phenol or mixture of phenols which is devoid of condensed ring systems. A molar ratio of phenolsulfonic acid:urea: formaldehyde of about 1:1:1.5 is of particular industrial interest.

Examples of phenols which may be used alone or in the form of technical mixtures are low molecular weight phenols such as halophenols of which chlorophenol is preferred and particularly cresols and phenol itself; other examples are bisphenols such as diphenylpropane and 4,4'-dioxydiphenylsulfone.

The procedure for the production of the precondensate (a) may be that the phenol is reacted with a molar amount of sulfuric acid by a known method, as for example according to German Pat. No. 1,113,457 and then after dilution and cooling for example urea and formaldehyde are added, generally as a 30 percent aqueous solution. This precondensate is then cooled and adjusted with an alkali metal hydroxide at a temperature which preferably does not exceed 70°C to the desired pH.

Component (b) which when using urea is known from German Pat. No. 889,225 is generally prepared by condensing the nitrogenous base with formaldehyde and sodium bisulfite at elevated temperature.

Urea, melamine and dicyandiamide have proved to be particularly advantageous nitrogenous bases for the production of the tanning agents of the invention.

Since the degree of sulfitation of the methylolated nitrogenous bases is important for the tanning action of the condensates, certain limits have to be observed. The optimum degree of sulfitation of the trimethylol compound of melamine is from 0.66 to 1.0 mole, preferably from 0.6 to 0.7 mole of sodium bisulfite per mole of melamine. In the case of the precondensate of urea which has been slightly precondensed with formaldehyde but is still soluble in water, the optimum ratio is from 0.2 to 1.2 moles of sodium bisulfite per mole or urea. In the case of dicyandiamide which has been precondensed with 4 moles of formaldehyde, the optimum ratio is from 1 to 1.2 moles of sodium bisulfite per mole of dicyandiamide.

The condensation conditions for the mixture of components (a) and (b) (whose molar ratio corresponds to the equation a:b = 1:1 to 9, preferably 1:2 to 5), the phenolic syntan and the methylolated nitrogenous base do not lie at the same temperature for all the individual nitrogenous bases specified, but the temperatures generally lie within the range from 40° to 80°C. The condensate obtained is in every case then cooled and adjusted with available acids, preferably formic acid, to a pH of from 3.0 to 5.0.

When the alkaline condensate has been previously sprayed (product (a)) the condensation period is shortened to from 2 to 3 minutes.

The powdered product then has about one third of its own weight of a mixture of sodium bisulfite and adipic acid in the ratio of 1:1 by weight added to it.

The following Examples illustrate the invention.

EXAMPLE 1

94 parts of phenol is heated with 100 parts of sulfuric acid (98 percent) at 98° to 100°C for 4 hours, then cooled to 50°C and 40 parts of water, 60 parts of urea and 150 parts of formaldehyde (30 percent) are added, the formaldehyde being fed in at 25° to 40°C in the course of 6 hours. The condensate is stirred for 2 hours at from 50° to 55°C, cooled to 25°C and 180 parts of 50 percent caustic soda solution is run in while cooling so that the temperature does not rise above 70°C.

The phenolic precondensate has added to it 600 parts of a precondensate (obtained according to Example 3 of German Pat. No. 889,225) at 50°C and the whole is kept at this temperature for 45 minutes. The condensate is then cooled to 25°C and adjusted to pH 3.5 to 4.0 with about 108 parts of formic acid (85 percent).

When spraying the alkaline condensate, the condensation period is shortened to from 2 to 3 minutes. The powdery product has about one third of its own weight of a mixture of sodium bisulfite and adipic acid (weight ratio 1:1) added to it.

EXAMPLE 2

A solution, prepared as follows, is added to the phenolic precondensate of Example 1:

126 parts of melamaine is dissolved in 300 parts of formaldehyde (30 percent) and 300 parts of water by heating to 90°C. Immediately after the solution has reached the said temperature it is cooled to 70°C and 70 parts of sodium bisulfite is added. A large amount of heat of reaction is evolved and this is counteracted by cooling so that the temperature does not rise above 95°C. This temperature is maintained for from five to ten minutes and the solution is then cooled to 70°C.

The solution of melamine at 70°C is added to the phenolic precondensate at 70°C and the mixture kept for 45 minutes at this temperature. The condensate is then cooled and adjusted to pH 3.5 to 4.0 with about 105 parts of formic acid.

When spraying the alkaline condensate, the condensation period of the mixture at 70°C is limited to 2 to 3 minutes. The powdery product is mixed with about one third of its own weight of sodium bisulfite.

EXAMPLE 3

A dicyandiamide solution prepared as follows is added to the phenolic precondensate of Example 1.

84 parts of dicyandiamide is heated in 400 parts of formaldehyde (30 percent) for three hours at 100°C. The solution is cooled to 70°C, 104 parts of sodium bisulfite is added and the temperature is allowed to rise to 95°C, if necessary by heating. The temperature is kept at 70°C and the alkaline precondensate from Example 1 is introduced.

The solution is cooled after forty-five minutes and 80 parts of formic acid (80 percent) is added. The pH of the condensate is then from 3.5 to 4.0.

The solution while still alkaline may also be sprayed in the case of a precondensation of only two to three minutes and adjusted to pH 3.5 to 4.0 with a solid acid such as sodium bisulfite and adipic acid.

We claim:

1. A process for the production of tanning agents based on condensation products by reaction of a sulfonated phenol devoid of condensed ring systems with formaldehyde, urea, melamine and/or dicyandiamide and a bisulfite, wherein
    a. a condensation product from phenolsulfonic acid, urea and formaldehyde in a molar ratio of 1:1 to 1.5:1.2 to 2.2 and
    b. a methylol compound of urea, melamine and/or dicyandiamide of a degree of sulfitation which corresponds to a molar ratio of bisulfite to nitrogenous compound of from 1:0.2 to 1:1.2 are reacted at 40°–80°C. at a pH in the range of 10 to 13 in a molar ratio of (a) to (b) of 1:1 to 1:9 and the product is then adjusted to a pH of from 3 to 5.

2. A process as claimed in claim 1 wherein the degree of sulfitataion of (b) corresponds to a molar ratio of bisulfite to nitrogenous compound of from 1:0.66 to 1:1.0.

3. A process as claimed in claim 1 wherein the molar ratio of phenolsulfonic acid:urea:formaldehyde in component (a) is 1:1:1.5.

4. A process as claimed in claim 1 wherein the molar ratio of (a):(b) is from 1:2 to 1:5.

5. A process as claimed in claim 1 wherein the reaction of (a) with (b) is carried out at a pH of from 10.5 to 11.5.

* * * * *